United States Patent
Eland

[15] 3,694,716
[45] Sept. 26, 1972

[54] GYROMOTOR SYNCHRONIZATION SYSTEM

[72] Inventor: Paul D. Eland, Dumont, N.J.

[73] Assignee: Singer-General Precision, Inc., Little Falls, N.Y.

[22] Filed: Aug. 14, 1970

[21] Appl. No.: 70,614

[52] U.S. Cl. ...................318/175, 318/314, 318/318
[51] Int. Cl. ..............................................H02p 7/36
[58] Field of Search......................318/175, 314, 318

[56] References Cited

UNITED STATES PATENTS

| | | | |
|---|---|---|---|
| 3,288,923 | 11/1966 | Arimura et al. | 318/175 X |
| 3,525,913 | 8/1970 | Huggett et al. | 318/175 X |
| 3,238,432 | 3/1966 | Amberger | 318/175 |
| 3,385,928 | 5/1966 | Rosenheck | 318/175 X |
| 3,401,321 | 9/1968 | Miki | 318/175 X |

Primary Examiner—Gene Z. Rubinson
Attorney—S. A. Giarratana and Thomas W. Kennedy

[57] ABSTRACT

In a system employing gyroscopes driven by AC motors at synchronous speeds the motors are controlled so that their rotors always occupy the same synchronous position with respect to the rotating magnetic fields in the motors. This control, which makes the drift of the gyroscope due to rotor unbalance constant, is achieved by generating a rotor marker pulse each time the rotor passes through a predetermined angular position and causing the rotor to be positioned so that this pulse occurs at a preselected point in the cycle of energization of the AC motor.

5 Claims, 3 Drawing Figures

INVENTOR
PAUL D. ELAND

INVENTOR
PAUL D. ELAND

GYROMOTOR SYNCHRONIZATION SYSTEM

Background of the invention

This invention relates to synchronization of rotor position with the excitation of a gyroscope motor for purposes of overcoming a problem of drift.

Gyroscopes are normally driven at a constant speed by means of an AC motor, referred to as a gyromotor, energized from an AC source having a precise frequency. In precise instruments utilizing gyroscopes a source of error which must be compensated is gyroscope drift. The amount and direction of the drift depends in part on unbalance in the rotor of the gyroscope and the position of this unbalance relative to the rotating magnetic field driving the rotor. Because the rotor can assume several positions with respect to the rotating field, which positions may differ each time the gyroscope is stopped and started, the amount and direction of the drift may change each time the gyroscope is turned off and on. Because this change in drift occurs when the motor power is interrupted, it is referred to as the gyromotor on-off effect.

If the drift is known, it can be readily compensated; however, if the drift changes each time the gyromotor power is interrupted, the compensation of the drift is more complex.

Summary of the invention

The system of the present invention controls a gyromotor so that the rotor always is brought to the same position with respect to the rotating magnetic field. Accordingly, the rotor unbalance is always the same with respect to the rotating magnetic field. As a result the drift due to any unbalance in the rotor will always be the same and thus can be readily compensated.

In accordance with the present invention, a signal is derived from a marker on the rotor each time the marker passes through one angular position. This signal is referred to as the rotor marker signal. Two additional marker signals which bear constant relationship to the AC excitation voltage for the gyromotor are also generated. These two additional marker signals are referred to as the excitation marker signals. The excitation marker signals, since they bear constant relationship to the excitation voltage, will bear a constant relationship to the rotating magnetic field. By controlling the gyromotor so that the rotor marker signal falls between the excitation marker signals, the rotor is brought to the same position with respect to the rotating field each time the gyroscope is started up. This control of the gyromotor is accomplished by first bringing the gyroscope up to speed when the gyroscope is turned on and then interrupting the power to the gyromotor until the rotor marker signal falls between the excitation marker signals whereupon the gyromotor is again energized. Thus the drift due to rotor unbalance is made always the same and therefor can be readily compensated.

Accordingly, an object of the present invention is to overcome the problem of gyromotor on-off effect.

Another object of the present invention is to facilitate compensation for gyroscope drift due to rotor unbalance.

A further object of the present invention is to synchronize the gyrorotor position with the excitation AC voltage driving the gyromotor.

A still further object of the present invention is to provide a system for selecting and controlling in a synchronously driven AC motor the rotor position relative to the motor field.

Further objects and advantages of the present invention will become readily apparent as the following detailed description of the invention unfolds and when taken in conjunction with the accompanying drawings.

DESCRIPTION OF A PREFERRED EMBODIMENT

Figure 1:
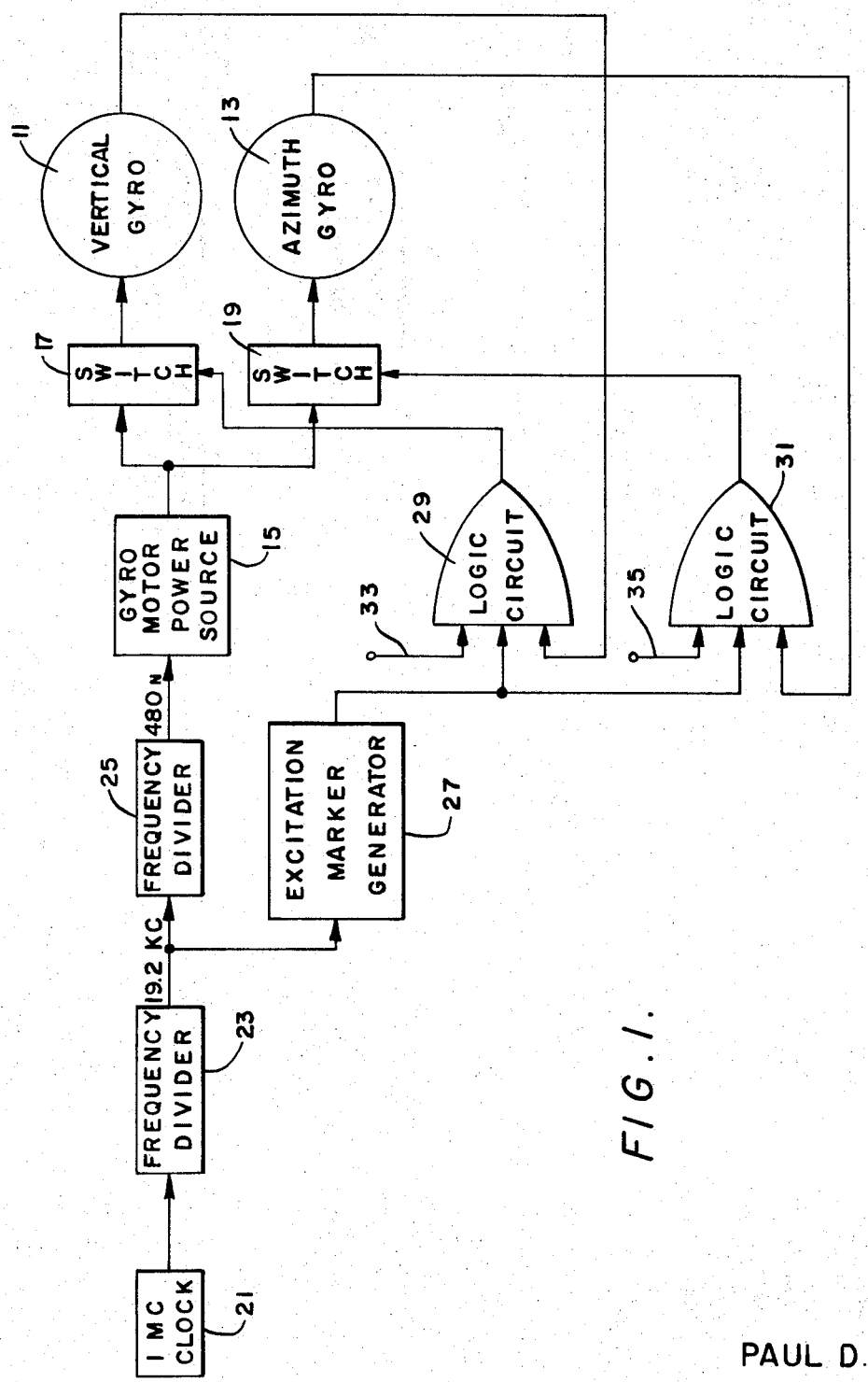
FIG. 1 is a block diagram illustrating the system of the present invention.

As shown in FIG. 1, azimuth and vertical gyroscopes 11 and 13 of a platform in a guidance or navigation system are energized from AC power source 15 through switches 17 and 19 respectively. A one megacycle signal from a clock source 21 is applied to a frequency divider 23, which in response to the applied clock signal generates an output frequency of 19.2 kilocycles precisely synchronized with the clock source. The output of the frequency divider 23 is applied to another frequency divider 25, which produces an output signal of 480 cycles per second precisely synchronized with the clock source. The output of the frequency divider 25 is applied to the AC power source 15 and the AC power source responds to the applied signal from the frequency divider 25 to produce the 480 cycle excitation voltage applied to the motors of the gyros 11 and 13 precisely in synchronism with the output signal of the frequency divider 25. In this manner the excitation voltage applied to the gyros 11 and 13 is controlled to have a very precise unchanging frequency and is also caused to be precise unchanging frequency and is also caused to be precisely in synchronism with the 19.2 'kilocycle output signal from the frequency divider 23.

Figure 2:
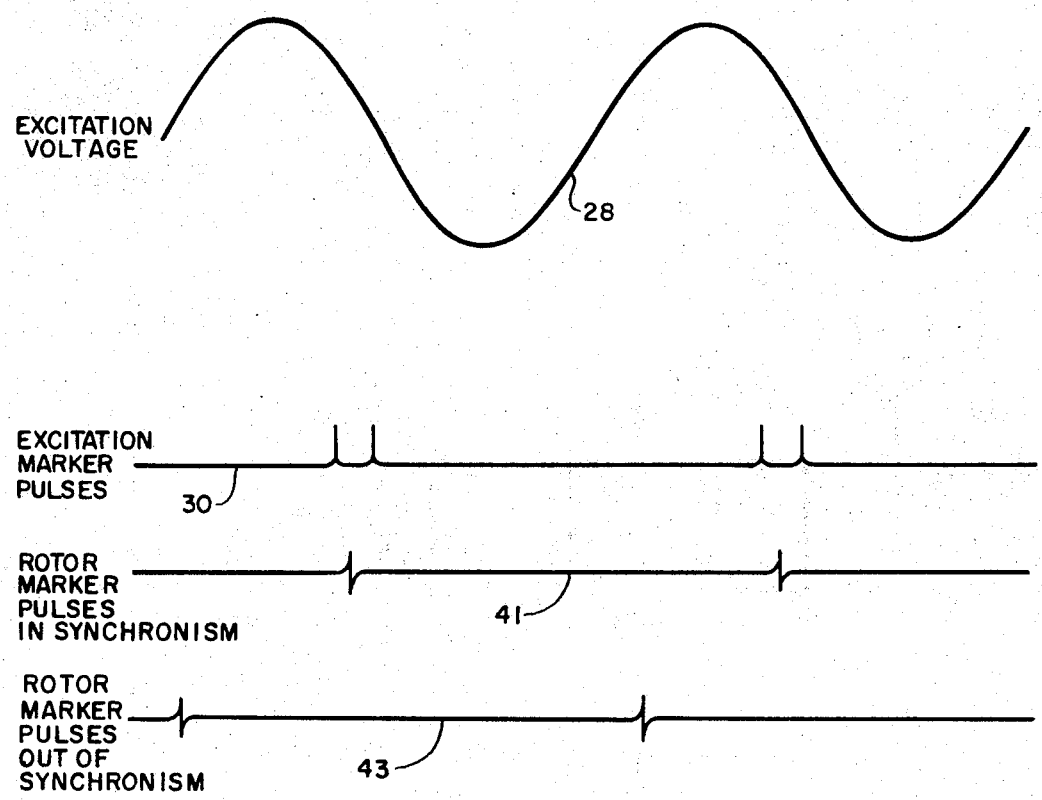
FIG. 2 shows some waveforms illustrating the operation of the present invention.

The 19.2 KC signal from the frequency divider 23 is also applied to a marker generator circuit 27, which produces output signal pulses at precisely selected times with respect to the output signal of the frequency divider 25 and therefor at precisely selected times with respect to the excitation voltage produced by the power source 15 and applied to the gyros 11 and 13. These pulses are referred to as the excitation marker pulses. In FIG. 2 the sign waveform 28 represents the excitation voltage applied by the power source 15 to the gyros 11 and 13 and the waveform 30 represents the excitation marker pulses and their time relationship to the excitation voltage. As shown in FIG. 2, the excitation marker pulses are produced in pairs, with the pulses of each pair being closely adjacent relative to the spaces between pairs. One pair of closely adjacent excitation pulses are produced in each cycle of excitation voltage. The excitation marker pulses, because of their synchronization with the excitation voltage, will always occur at the same points in each cycle of the excitation voltage. Each pair of excitation marker pulses thus defines a predetermined corresponding portion of each cycle of excitation voltage. The portion defined by each pair of closely adjacent pulses is less than one-eighth of a cycle for a fourpole motor.

The marker generator 27 may, for example, be a counter which recycles every 40 output cycles of the frequency divider 23 and which produces the excitation marker signals on predetermined counts of each cycle. Since the frequency divider 25 producing its output at 480 cycles per second will produce one output cycle for every 40 output cycles of the frequency divider 23, the marker signals produced by the generator 27 will be precisely synchronized with the 480 cycle signal produced by the frequency divider 25 and therefor will be precisely synchronized with the 480 cycle excitation voltage applied to the gyros 11 and 13.

The marker signals produced by the marker generator 27 are applied to logic circuits 29 and 31 which control the switches 17 and 19. The logic circuits 29 and 31, when not inhibited by signals applied the inputs 33 and 35 thereof respectively, will close the switches 17 and 19 only if the rotor marker pulses produced by the rotors of the gyros 11 and 13 fall between closely adjacent excitation marker pulses. If the rotor marker pulse produced by the gyro 11 does not fall between closely adjacent excitation marker pulses the logic circuit 29, if not inhibited by a signal applied to the input 33, will open the switch 17 and interrupt power to the motor of the gyroscope 11. Similarly the logic circuit 31, if not inhibited by a signal applied to the input 35, will open the switch 19 and interrupt power to the motor of the gyroscope 13 if the rotor marker pulse produced by the gyro 13 does not fall between closely adjacent excitation marker pulses. In FIG. 2 the waveform 41 represents a rotor marker pulse falling between closely adjacent excitation marker pulses and the waveform 43 represents a rotor marker pulse falling outside the closely adjacent excitation marker pulses. If the rotor marker pulses represented by the waveform 43 were produced by the gyroscope 11, then the logic circuit 29 when not inhibited by a signal applied to the input 33 would open the switch 17 and interrupt the power applied to the gyroscope 11. If the gyroscope 11 produced rotor marker pulses corresponding to waveform 41, then the logic circuit 29 would maintain the switch 17 closed. The logic circuit 31 operates in a similar manner to control the switch 19 in response to the excitation marker pulses and the rotor marker pulses.

In operation each time the gyroscopes are turned on, an inhibit signal is applied to the inputs 33 and 35 of the logic circuits 29 and 31 so that the excitation voltage produced by the power source 15 is applied to both the gyroscopes 11 and 13 and the gyroscopes 11 and 13 are allowed to be brought up to synchronous speed. When the gyroscopes have reached synchronous speed, the inhibiting signal applied to inputs 33 and 35 is removed. If the rotor marker pulse produced by the gyroscope 11 falls between closely adjacent excitation marker pulses when the inhibiting signals are removed, the logic circuit 29 will maintain the switch 17 closed and the gyroscope 11 will be maintained energized. If on the other hand the rotor marker pulse produced by the gyroscope 11 falls outside the closely adjacent excitation marker pulses such as represented by the waveform 43 in FIG. 2, then the logic circuit 29 will open the switch 17 and interrupt the energization of the gyroscope 11 when the inhibiting signal is removed from input 33. The speed of the rotor of the gyro 11 as a result will slow down slightly from synchronous speed and accordingly the position of the rotor marker pulse will move relative to the excitation pulses until it falls between closely adjacent excitation marker pulses. When the rotor marker pulse has moved between closely adjacent excitation marker pulses, the logic circuit 29 will close the switch 17 and thus re-energize the gyroscope 11 causing it again to be driven at synchronous speed with respect to the excitation voltage. As a result the rotor of the gyroscope 11 will be brought to the same position with respect to the rotating magnetic field of the gyromotor each time the gyroscope 11 is started up. The logic circuit 31 controls the switch 19 in a similar manner so that the rotor marker pulse produced by the gyroscope 13 is always brought between closely adjacent excitation marker pulses each time the gyroscope 13 is started up.

Figure 3:
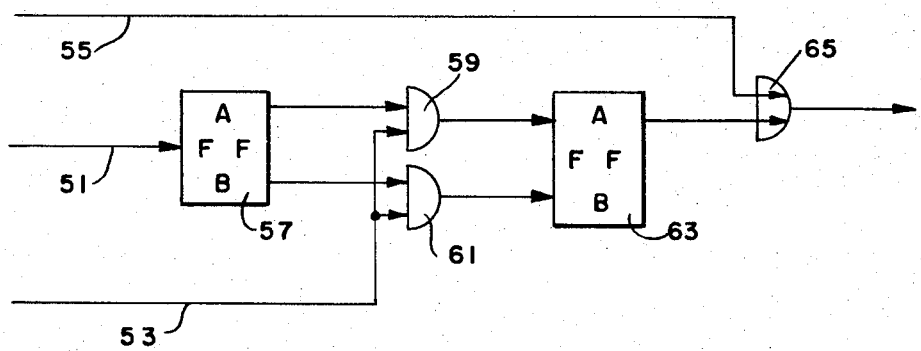
FIG. 3 is a block diagram illustrating a portion of the system shown in FIG. 1 in detail.

The block diagram of FIG. 3 illustrates the details of the logic circuits 29 and 31. As shown in FIG. 3 the excitation marker pulses are applied over an input 51 and the rotor marker pulses are applied over an input 53. The signal for inhibiting the logic circuit from opening the switch to interrupt power to the gyroscope is applied to input 55. The excitation marker pulses are applied to a flip-flop 57 and each pulse applied to the flip-flop 57 causes the flip-flop 57 to switch to the opposite state. The states of the flip-flop 57 for convenience are designated the A state and the B state. The flip-flop 57 is initially set so that the first excitation marker pulse of a closely adjacent pair will switch the flip-flop 57 to its A state and the second excitation marker pulse will switch the flip-flop 57 back to its B state. Thus during the time interval between the pair of closely adjacent excitation marker pulses that occur in each cycle, the flip-flop 57 will be in its A state. At all other times the flip-flop 57 will be in its B state. When the flip-flop 57 is in its A state, it enables a gate 59 and when it is in its B state the flip-flop 57 will enable a gate 61. The rotor marker pulses applied at input 53 are applied to the gates 59 and 61. When the gate 59 is enabled the rotor marker pulse will pass through the gate 59 to a flip-flop 63. When the gate 61 is enabled the rotor marker pulse will pass through the gate 61 and be applied to the flip-flop 63. The states of the flip-flop 63 are also for convenience designated the A state and the B state. A rotor marker pulse passing through the gate 59 will set the flip-flop 63 in its A state and a rotor marker pulse passing through the gate 61 will set the flip-flop 63 in its B state. Thus if the rotor marker pulse occurs between closely adjacent excitation marker pulses, the flip-flop 63 will be set in its A state, and if it falls outside the closely adjacent excitation marker pulses, the flip-flop 63 will be set in its B state. When the flip-flop 63 is in its A state it will apply an output signal through an OR gate 65 to close the corresponding one of the switches 17 and 19. Thus whenever the flip-flop 63 is in its A state the corresponding switch will be closed. The inhibiting signal applied to input 55 is also applied through the OR gate 65 to close the corresponding one of the switches 17 and 19. Thus the switch will be closed whenever the flip-flop 63 is in its A state or whenever the inhibiting signal is applied to input 55. When the inhibiting signal is not applied to the input 55 and the flip-flop 63 is in its B state, the corresponding switch will be open. Accordingly, whenever the inhibiting signal is not applied to input 55 and the rotor marker pulse falls outside the closely adjacent excitation marker pulses, the corresponding switch controlling the excitation of the corresponding gyroscope will be opened.

In the system described above each of the gyroscopes 11 and 13 is controlled so that the rotor marker pulse of each of the gyroscopes always will be brought between closely adjacent excitation marker pulses and in this manner the rotors of each of the gyroscopes 11 and 13 is always brought to the same position with respect to the rotating magnetic field for each of the gyroscopes 11 and 13. In this manner the drift due to rotor unbalance is made the same each time the gyroscopes 11 and 13 are started up and thus the drift is readily compensated.

The above description is of a preferred embodiment of the invention and many modifications may be made thereto without departing from the spirit and scope of the invention, which is defined in the appended claims.

What is claimed is:

1. A gyroscope energization system comprising a gyro, an AC motor connected to drive said gyro, an AC source for energizing said motor with AC power producing a cyclical field for driving the rotor of said motor at synchronous speed said rotor having a plurality of possible synchronous positions with respect to said cyclical field when driven at synchronous speed, and comparison means to detect whether said rotor occupies a predetermined one of said plurality of synchronous positions with respect to said cyclical field wherein said AC source includes, a clock frequency source, frequency divider means serially connected to said clock source, said divider means adapted to provide a first AC signal, power source means serially connected to said divider means, said power source means adapted to output a second AC signal for energizing said motor, and wherein said comparison means includes, generator means adapted to receive said first AC signal, said generator means adapted to provide a first pulse and a second pulse, each said first pulse and second pulse being in synchronism with said second AC signal, and wherein said comparison means further includes rotor marker means, said rotor marker means adapted to provide a third pulse for indicating the position of said rotor, and wherein said comparison means further includes digital logic means for comparing the time relationship between the third pulse and the first and second pulses so as to produce an output control signal only when said third pulse falls between said first pulse and said second pulse.

2. A gyroscope energization system as recited in claim 1, wherein said comparison means further includes automatic means responsive to said control signal for automatically positioning said rotor such that said third pulse falls between said first pulse and said second pulse, and wherein said comparison means further includes gate means selectively operable to disable said automatic means.

3. A gyroscope energization system as recited in claim 2 wherein said generator means includes a counter device arranged such that the time between said first pulse and second pulse is less than one-eighth of each cycle of said second AC signal.

4. A gyroscope energization system as recited in claim 3 wherein said power source means further includes switch means for momentarily interrupting said second AC signal from energizing said motor upon command from said digital logic means.

5. A gyroscope energization system as recited in claim 4 wherein said digital logic means includes a first flip flop serially connected to a pair of logic devices, said devices serially connected to a second flip flop, said second flip flop serially connected to said gate means.

* * * * *